United States Patent
Noni, Jr.

(10) Patent No.: US 8,438,876 B2
(45) Date of Patent: May 14, 2013

(54) METHOD AND APPARATUS FOR REMOVING GLASS SOOT SHEET FROM SUBSTRATE

(75) Inventor: Douglas Miles Noni, Jr., Horseheads, NY (US)

(73) Assignee: Corning Incorporated, Corning, NY (US)

( * ) Notice: Subject to any disclaimer, the term of this patent is extended or adjusted under 35 U.S.C. 154(b) by 475 days.

(21) Appl. No.: 12/748,479

(22) Filed: Mar. 29, 2010

(65) Prior Publication Data

US 2011/0232330 A1  Sep. 29, 2011

(51) Int. Cl.
*C03B 37/018* (2006.01)

(52) U.S. Cl.
USPC ............................................. 65/413; 65/421

(58) Field of Classification Search .................. 65/144, 65/413, 421; 118/718
See application file for complete search history.

(56) References Cited

U.S. PATENT DOCUMENTS

| | | | |
|---|---|---|---|
| 3,806,570 A | 4/1974 | Flamenbaum et al. | 264/66 |
| 3,844,751 A | 10/1974 | Stewart | 65/4 |
| 4,494,968 A | 1/1985 | Bhagavatula et al. | 65/6.12 |
| 4,735,677 A | 4/1988 | Kawachi et al. | 156/633 |
| 5,922,100 A | 7/1999 | Cain et al. | 65/531 |
| 6,263,706 B1 | 7/2001 | Deliso et al. | 65/397 |
| 6,606,883 B2 | 8/2003 | Hrdina et al. | 65/17.4 |
| 6,736,633 B1 | 5/2004 | Dawson-Elli et al. | 431/328 |
| 6,743,011 B2 | 6/2004 | Bakshi et al. | 431/328 |
| 6,837,076 B2 | 1/2005 | Hawtof | 65/413 |
| 2004/0007019 A1 | 1/2004 | Kohli | 65/17.6 |
| 2004/0089237 A1 | 5/2004 | Pruett et al. | 118/719 |
| 2006/0063351 A1 | 3/2006 | Jain | 438/455 |
| 2008/0280057 A1 | 11/2008 | Hawtof et al. | 427/450 |

FOREIGN PATENT DOCUMENTS

| | | |
|---|---|---|
| JP | 9-286621 | 11/1997 |
| WO | 2005/024908 | 3/2005 |
| WO | 2008/136924 A1 | 11/2008 |

OTHER PUBLICATIONS

"The Achille Heel of a Wonderful Material: Toughened glass", www.glassonweb.com.

*Primary Examiner* — Queenie Dehghan
(74) *Attorney, Agent, or Firm* — Michael W. Russell

(57) ABSTRACT

As a precursor to forming a glass sheet, a soot layer is formed on a deposition surface using a roll-to-roll glass soot deposition process. A soot layer-separating device is configured to bring a stream of gas into contact with at least a portion of a free surface of the soot layer. The impinging gas stream affects local thermal expansion stresses at the soot layer/deposition surface interface, which separates the soot layer from the deposition surface.

8 Claims, 5 Drawing Sheets

3A					3B 3C					3D

METHOD AND APPARATUS FOR REMOVING GLASS SOOT SHEET FROM SUBSTRATE

BACKGROUND AND SUMMARY

The present disclosure relates generally to glass soot sheets and more specifically to a removal method and apparatus for separating glass soot sheets such as silica glass soot sheets from a substrate.

Glass sheet materials can be formed using a variety of different methods. In a float glass process, for example, a sheet of solid glass is made by floating molten glass on a bed of molten metal. This process can be used to form glass sheets having uniform thickness and very flat surfaces. However, float glass processes necessarily involve direct contact between the glass melt and the molten metal, which can lead to undesired contamination at the interface and less than pristine surface quality. In order to produce high quality float glass sheets with pristine surface properties on both major surfaces, float glass is typically subjected to surface polishing steps, which add additional expense. Moreover, it is believed that the float process has not been used to make ultra-thin, rollable glass sheets.

An additional method for forming glass sheet materials is the fusion draw process. In this process, molten glass is fed into a trough called an "isopipe," which is overfilled until the molten glass flows evenly over both sides. The molten glass then rejoins, or fuses, at the bottom of the trough where it is drawn to form a continuous sheet of flat glass. Because both major surfaces of the glass sheet do not directly contact any support material during the forming process, high surface quality in both major surfaces can be achieved.

Due to the dynamic nature of the fusion draw process, the number of glass compositions suitable for fusion draw processing is limited to those that possess the requisite properties in the molten phase (e.g., liquidus viscosity, strain point, etc.). Further, although relatively thin glass sheets can be made via fusion draw, the process cannot be used to form ultra-thin, rollable high-silica glass sheets. Finally, the apparatus used in the fusion draw process can be expensive.

In addition to their limitations with respect to ultra-thin glass sheet materials, both float and fusion draw processes are largely impractical sheet-forming methods for high-silica glass sheets due to the high softening point (~1600° C.) of silica. Rather, silica glass substrates are typically produced by cutting, grinding and polishing silica ingots produced in batch flame-hydrolysis furnaces. Such a batch approach is extremely expensive and wasteful. Indeed, the requisite slicing and polishing that would be needed to produce uniform, thin, flexible silica glass sheets via flame-hydrolysis would render the process prohibitively expensive. Using known methods, Applicants believe that it is not currently feasible to form and polish both sides of a high-silica glass sheet having a thickness of less than 150 microns.

In view of the foregoing, economical, uniform, ultra-thin, flexible, rollable glass sheets having a high surface quality are highly desirable. The glass sheets can comprise one or more layers, components, or phases. Such glass sheets can be used, for example, as photo mask substrates, LCD image mask substrates, and the like.

A method of forming glass sheets involves a glass soot deposition and sintering process. According to various embodiments, a glass soot layer can be formed on a substrate, separated from the substrate to form a glass soot sheet, which can be sintered to form a sintered glass sheet. A high-silica glass sheet made using the foregoing deposition and sintering approach can have an average thickness of 150 microns or less and an average surface roughness over at least one of two major opposing surfaces of 1 nm or less.

In an embodiment, a glass soot layer is formed on a substrate such that the glass soot layer has a first main surface in direct physical contact with the substrate and a second main surface opposed to the first main surface. According to one method for separating the glass soot layer from the substrate, at least a portion of the second main surface of the glass soot layer is contacted with a gas stream so as to induce separation of a corresponding portion of the first main surface from the substrate.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

Figure 1:
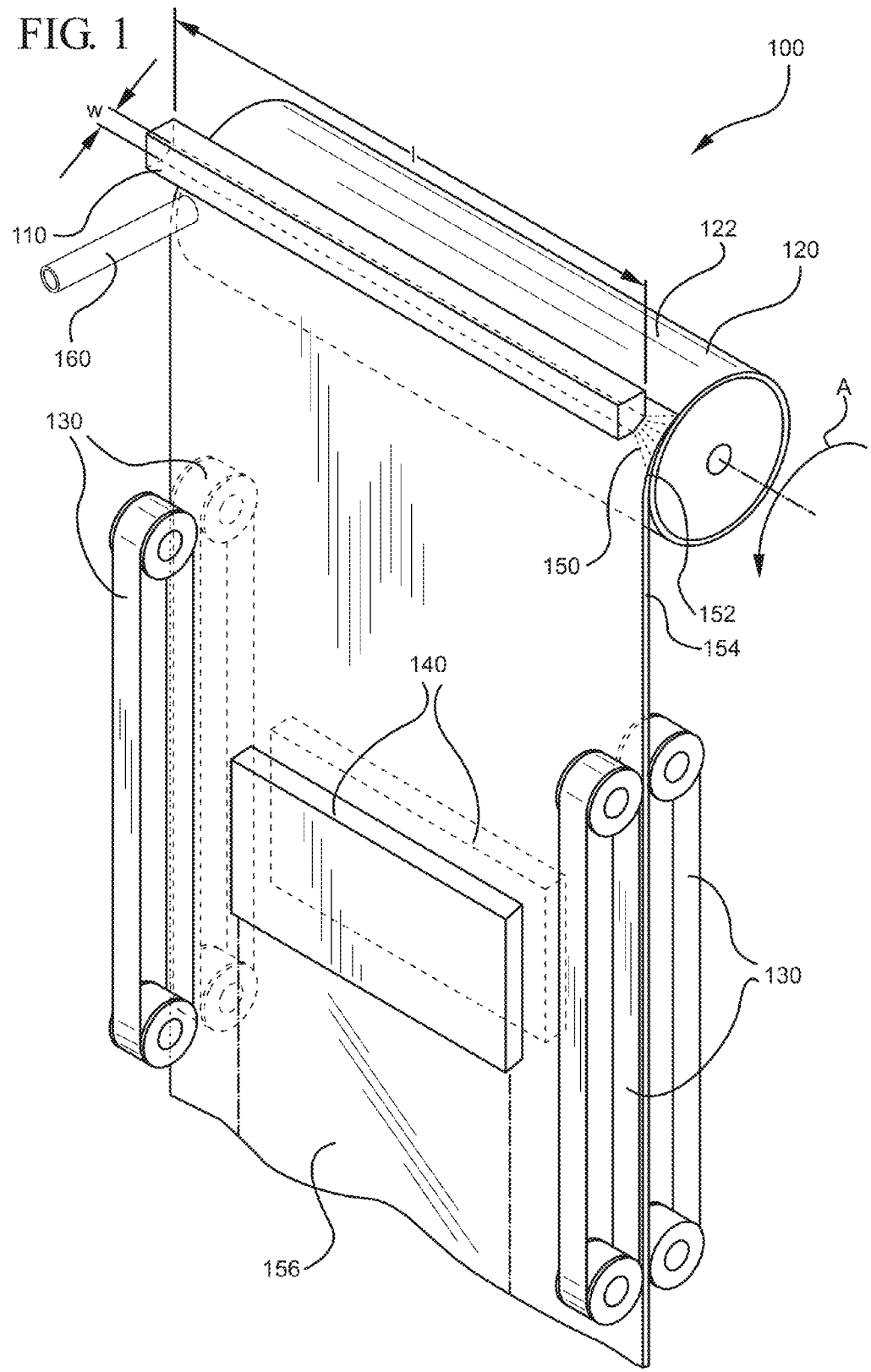
FIG. 1 is a schematic illustration of an apparatus for forming an ultra-thin glass sheet.

An example apparatus for forming glass sheets is shown schematically in FIG. 1. The apparatus 100 comprises a soot-providing device 110, a soot-receiving device 120, a soot layer-separating device 160, a soot sheet-guiding device 130, and a soot sheet-sintering device 140.

Glass soot particles formed by the soot-providing device 110 are deposited on a deposition surface 122 of the soot-receiving device 120. The soot-receiving device 120 is in the form of a rotatable drum or belt and can comprise a continuous deposition surface 122. The deposited soot particles 150 form a soot layer 152 on the deposition surface 122. The soot layer 152, once formed, can be separated from the deposition surface 122 as a free-standing, continuous soot sheet 154. The act of separating the soot layer 152 from the deposition surface 122 can be aided by a soot layer-separating device 160. After the soot sheet 154 is separated from the soot-receiving device 120, a soot sheet-guiding device 130 can guide movement of the soot sheet 154 through a soot sheet-sintering device 140, which sinters and consolidates the soot sheet 154 to form an ultra-thin glass sheet 156.

A process of forming an ultra-thin glass sheet comprises providing a plurality of glass soot particles, depositing the glass soot particles on a deposition surface of a soot-receiving device to form a soot layer, separating the soot layer from the soot-receiving surface to form a soot sheet, and sintering the soot sheet to form a glass sheet. Additional aspects of the process and apparatus are disclosed in detail herein below.

Although a variety of devices may be used to form glass soot particles, by way of example, the soot providing device 110 may comprise one or more flame hydrolysis burners, such as those used in outside vapor deposition (OVD), vapor axial deposition (VAD) and planar deposition processes. Suitable burner configurations are disclosed in U.S. Pat. Nos. 6,606,883, 5,922,100, 6,837,076, 6,743,011 and 6,736,633, the contents of which are incorporated herein by reference in their entirety.

The soot-providing device 110 may comprise a single burner or multiple burners. An example burner has an output surface having length l and width w. The output surface comprises M rows and N columns of gas orifices where M and N can independently range from 1 to 20 or more. In an embodiment, each orifice comprises a 0.076 cm diameter hole. The orifices can be arranged in a square array having a 0.076 cm pitch between orifices. The length l of the output surface can range from about 2.5 to 30.5 cm or more, and the width can range from 0.1 to 7.5 cm. Optionally, multiple burners can be configured into a burner array that can produce a substantially continuous stream of soot particles over the length and width of the array.

A burner array, for example, may comprise a plurality of individual burners (e.g., placed end-to-end) configured to form and deposit a temporally and spatially uniform layer of glass soot. Thus, the soot-providing device 110 can be used to form a layer of soot 152 having a substantially homogeneous chemical composition and a substantially uniform thickness. By "uniform composition" and "uniform thickness" is meant that the composition and thickness variation over a given area is less than or equal to 20% of an average composition or thickness. In certain embodiments, one or both of the compositional and thickness variation of the soot sheet can be less than or equal to 10% of their respective average values over the soot sheet.

An example burner comprises 9 columns of gas orifices. During use, according to one embodiment, the centerline column (e.g., column 5) provides a silica gas precursor/carrier gas mixture. The immediately adjacent columns (e.g., columns 4 and 6) provide oxygen gas for stoichiometry control of the silica gas precursor. The next two columns on either side of the centerline (e.g., columns 2, 3, 7 and 8) provide additional oxygen, the flow rate of which can be used to control stoichiometry and soot density, and provide an oxidizer for the ignition flame. The outermost columns of orifices (e.g., columns 1 and 9) can provide an ignition flame mixture of, for example, $CH_4/O_2$ or $H_2/O_2$. Example gas flow rate ranges for a 9 column linear burner are disclosed in Table 1.

TABLE 1

Example gas flow rates for 9 column linear burner

| Gas | Burner column(s) | Example flow rate |
|---|---|---|
| OMCTS | 5 | 15 g/min |
| $N_2$ | 5 | 40 SLPM |
| $O_2$ | 4, 6 | 18 SLPM |
| $O_2$ | 2, 3, 7, 8 | 36 SLPM |
| $CH_4$ | 1, 9 | 36 SLPM |
| $O_2$ | 1, 9 | 30 SLPM |

The soot-providing device may be held stationery during formation and deposition of the soot particles or, alternatively, the soot-providing device may be moved (e.g., oscillated) with respect to the deposition surface. A distance from the burner output surface to the deposition surface can range from about 20 mm to 100 mm (e.g., 20, 25, 30, 35, 40, 45, 50, 55, 60, 65, 70, 75, 80, 85, 90, 95 or 100 mm).

Operation of the soot-providing device typically involves chemical reactions between precursor chemicals (e.g., gaseous compounds) to form glass soot particles. Optionally, the chemical reactions can be further assisted by supplemental energy sources such as plasma or a supplemental heating device.

Silicon-containing precursor compounds, for example, can be used to form soot sheets comprising silica soot particles that can be sintered to form silica glass sheets. An example silica gas precursor is octamethylcyclotetrasiloxane (OMCTS). OMCTS can be introduced into a burner or burner array together with $H_2$, $O_2$, $CH_4$ or other fuels where it is oxidized and hydrolyzed to produce silica soot particles. Although the process of forming a glass sheet typically comprises forming a high-silica glass sheet, the process and apparatus can be used to form other glass sheet materials as well.

As-produced or as-deposited, the soot particles may consist essentially of a single phase (e.g., a single oxide) such as in the example of un-doped, high-purity silica glass. Alternatively, the soot particles may comprise two or more components or two or more phases, such as in the example of doped silica glass. For instance, multiphase high-silica glass sheets can be made by incorporating a titanium oxide precursor or a phosphorous oxide precursor into the OMCTS gas flow. Example titanium and phosphorous oxide precursors include various soluble metal salts and metal alkoxides such as halides of phosphorous and titanium (IV) isopropoxide.

In the example of a flame hydrolysis burner, doping can take place in situ during the flame hydrolysis process by introducing dopant precursors into the flame. In a further example, such as in the case of a plasma-heated soot sprayer, soot particles sprayed from the soot-providing device can be pre-doped or, alternatively, the sprayed soot particles can be subjected to a dopant-containing plasma atmosphere such that the soot particles are doped in the plasma. In a still further example, dopants can be incorporated into a soot sheet prior to or during sintering of the soot sheet. Example dopants include elements from Groups IA, IB, IIA, IIB, IIIA, IIIB, IVA, IVB, VA, VB and the rare earth series of the Periodic Table of Elements.

The soot particles can have an essentially homogeneous composition, size and/or shape. Alternatively, one or more of the composition, size and shape of the soot particles can vary. For example, soot particles of a main glass component can be provided by a first soot-providing device, while soot particles of a dopant composition can be provided by a second soot-providing device. In certain embodiments, soot particles can mix and/or adhere to one another during the acts of forming and depositing the soot particles to form composite particles. It is also possible that the soot particles are substantially prevented from adhering to each other to form mixed particles prior to or while being deposited on the deposition surface.

Referring still to FIG. 1, deposition surface 122 comprises a peripheral portion of the soot-receiving device 120 and can be formed of a refractory material. In an embodiment, the deposition surface 122 is formed of a material that is chemically and thermally compatible with both the soot particles 150 and the deposited soot layer 152, and from which the soot layer can be removed. Example soot-receiving devices 120 comprise a coating or cladding of a refractory material (e.g., silica, silicon carbide, graphite, zirconia, etc.) formed over a core material of, for example, steel, aluminum or metal alloy.

Further soot-receiving devices can comprise a unitary part consisting essentially of a suitable refractory material such as quartz.

The soot-receiving device 120 and particularly the deposition surface 122 can be configured in a variety of different ways and have a variety of shapes and/or dimensions. For example, a width of the deposition surface can range from about 2 cm to 2 m, although smaller and larger dimensions are possible. A cross-sectional shape of the soot-receiving device 120 can be circular, oval, elliptical, triangular, square, hexagonal, etc., and a corresponding cross-sectional dimension (e.g., diameter or length) of the soot-receiving device 120 can also vary. For example, a diameter of a soot-receiving device having a circular cross section can range from about 2 cm to 50 cm. An example soot-receiving device 120 comprises a quartz cylinder having a 250 mm inner diameter, a 260 mm outer diameter, and a 24 cm wide deposition surface.

In the examples of circular or oval cross-sections, the deposition surface 122 can comprise a closed, continuous surface, while in the examples of elliptical, triangular, square or hexagonal cross-sections, the deposition surface can comprise a segmented surface. By appropriately selecting the size and dimensions of the soot-receiving device 120, a continuous or semi-continuous soot sheet can be formed.

The deposition surface 122 can include regular or irregular patterning in the form of raised or lowered protrusions across a range of length scales. The patterning can range from one or more discrete facets to a general roughing of the surface. A deposited soot layer can conform to the patterning in the deposition surface. The pattern formed in the soot surface can be retained in the deposited surface of the soot sheet as it is separated from the deposition surface and, in turn, preserved in the sintered surface of the resulting glass sheet resulting in an embossed glass sheet. In a variation of the above-described deposition surface-derived embossing, one or both of the deposited surface and the free surface of a soot sheet can be patterned after it is removed from the deposition surface but prior to sintering. For example, Applicants have patterned a soot sheet surface with a fingerprint. Upon sintering of the soot sheet, the fingerprint pattern is retained in the resulting glass sheet.

In certain embodiments, the soot-receiving device 120 is rotated during the act of depositing soot particles 150 in order to form a soot layer 152 thereon. The rotation can be unidirectional, e.g., clockwise or counter-clockwise. A direction of rotation according to one embodiment is indicated by arrow A in FIG. 1. Optionally, the soot-receiving device may oscillate during the soot deposition process, i.e., the rotation direction may change intermittently. A linear velocity of the deposition surface 122 of the soot-receiving device 120 can range from 0.1 mm/sec to 10 mm/sec (e.g., 0.1, 0.2, 0.5, 1, 2, 3, 4, 5 or 10 mm/sec). In scale-up, it is believed that the linear velocity of the deposition surface can be increased up to 1 m/sec or higher.

Soot particles 150 are deposited on only a portion of the deposition surface 122 (i.e., within a deposition zone), and the deposited soot layer 152 can be separated to form a free-standing continuous or semi-continuous soot sheet 154 having length L. As illustrated in FIG. 1, a width of the deposited layer 152 (and nominally of the soot sheet 154) is W. A width of the deposition surface 122 of the soot-receiving device 120 can be greater than, approximately equal to, or less than a corresponding length of the output surface of the burner.

In certain embodiments, the soot layer can be continuously formed on and continuously separated from the deposition surface. During formation of a soot layer, soot particles bond to a certain degree with each other and with the deposition surface. The higher the average temperature of the soot particles when they are being deposited, the more likely they are to bond with each other and form a dense and mechanically robust soot sheet. However, higher deposition temperatures also promote bonding between the soot particles and the deposition surface, which can interfere with releasing of the soot sheet. To obtain a substantially uniform temperature across the deposition surface, the soot-receiving device can be heated or cooled either from the inside, the outside, or both.

Bonding between soot particle and the deposition surface can be controlled by controlling a temperature gradient between a location where the soot particles are deposited and a location where the soot layer is released to form a soot sheet. For instance, if the soot layer and the deposition surface have sufficiently different coefficients of thermal expansion (CTEs), the release may occur spontaneously due to stress caused by the temperature gradient. In certain embodiments, removal of the deposited soot layer from the deposition surface can be made easier by forming a soot layer having a width W that is less than the width of the deposition surface 122.

During the act of separating the soot layer from the deposition surface, a direction of motion of the separated soot sheet can be substantially tangential to a release point on the deposition surface. By "substantially tangential" is meant that the direction of motion of the soot sheet relative to a release point on the deposition surface deviates by less than about 10 degrees (e.g., less than 10, 5, 2 or 1 degrees) from a direction that is tangential to the deposition surface at the release point. Maintaining a substantially tangential release angle can reduce the stress exerted on the soot sheet at the release point.

For a soot-receiving device having a circular or oval cross section, the curvature of the deposition surface is a function of the cross-sectional diameter(s) of the soot-receiving device. As the diameter increases, the radius of curvature increases, and stresses in the deposited soot decrease as the shape of the deposited soot sheet approaches that of a flat, planar sheet.

In embodiments, the soot sheet has sufficient mechanical integrity to support its own mass (i.e., during the acts of removal from the deposition surface, handling and sintering) without fracturing. Process variables that can affect the physical and mechanical properties of the soot sheet include, inter alia, the thickness and density of the soot sheet, the curvature of the deposition surface, and the temperature of the soot sheet during formation.

A soot sheet 154 comprises two major surfaces, only one of which contacts the deposition surface 122 during formation of the soot layer 152. Thus, the two major surfaces of the soot sheet and the sintered glass sheet derived therefrom may be characterized and distinguished as the "deposited surface," and the opposing "free surface."

A soot layer-separating device 160 can be used to separate the soot layer from the deposition surface. The soot layer-separating device is configured to bring a stream of gas into contact with at least a portion of the free surface of the soot layer. Without wishing to be bound by theory, it is believed that the impinging gas stream affects local thermal expansion stresses at the soot layer/deposition surface interface and, in the region of the soot layer where the gas stream is directed, the soot layer can be more easily separated from the underlying deposition surface.

Unlike a conventional air knife, which would direct a gas jet at the deposited surface of the soot in order to force the soot layer away from the deposition surface, the soot layer-separating device directs a gas stream into the free surface of the deposited soot layer. An air knife directed at the deposited surface of the soot would be unable to impinge the soot layer prior to its separation from the deposition surface. Further, in contrast to the disclosed method, and particularly for very thin soot sheets, impingement of a gas stream on the deposited surface of the soot sheet would tear or fracture the soot.

The soot layer-separating device may comprise a single gas output or multiple outputs. One example soot layer-separating device comprises a tube having an open end configured to provide a gas flow there-through. A further example of a soot layer-separating device comprises a showerhead having a plurality of openings through which gas can flow.

Figure 2:
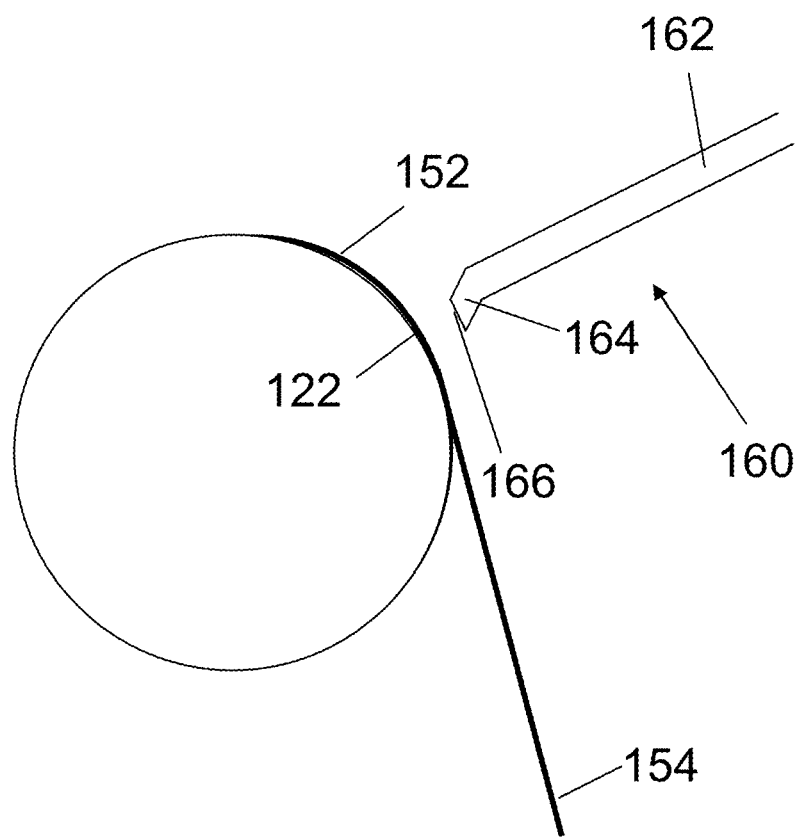
FIG. 2 is an example configuration of a soot layer-separating device according to an embodiment.

An example configuration of a soot layer-separating device is illustrated in FIG. 2, which shows a cross-sectional schematic of soot layer-separating device 160 positioned proximate to deposition surface 122 and deposited soot layer 152. The soot layer-separating device 160 includes a gas conduit 162 having a gas nozzle 164. A gas conduit can comprise a tube such as a stainless steel tube having any suitable dimensions. An example tube can have a cross-sectional diameter ranging from about 0.125 to 1 inch. Example dimensions are shown in units of inches.

As shown in FIG. 2, nozzle 164 having gas outlet 166 is oriented at an angle $\Phi$ with respect to the deposition surface normal. The nozzle 164 and gas outlet 166 can be oriented such that an incident angle of the gas stream upon the soot ranges from 0° (i.e., normal incidence) to nearly 90°. Example incident angles $\Phi$ include 0, 10, 20, 30, 40, 50, 60, 70 and 80°±5°.

An areal profile of the gas stream may be symmetric or asymmetric and may be directed at any suitable combination of a center region or one or more edge regions of the soot layer. Thus, the impingement of a gas stream may be localized with respect to a width of the soot layer as well as a length. By localized is meant that the gas stream impinges one area of the soot layer to the exclusion of other areas. FIGS. 3A-3D illustrate exemplary gas stream distribution profiles, which show the gas stream impact zone 170 with respect to the soot layer 152 and soot sheet 154.

Figure 3:
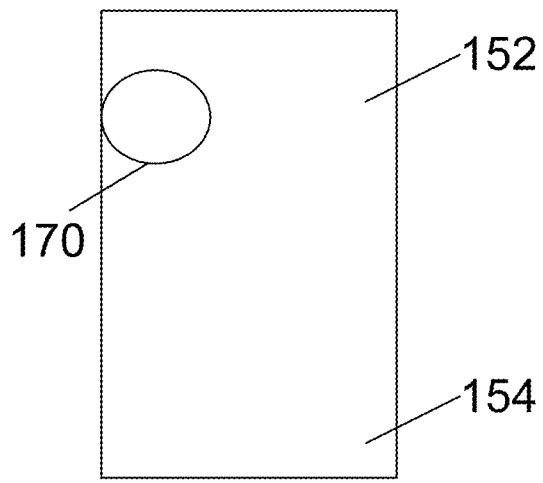
FIGS. 3A-3D illustrate example gas stream configurations according to various embodiments.
Figure 3:
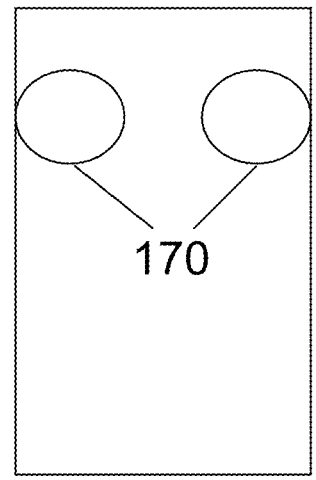
Figure 3:
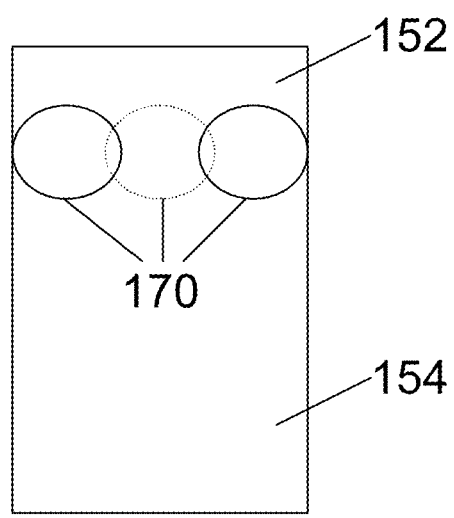
Figure 3:
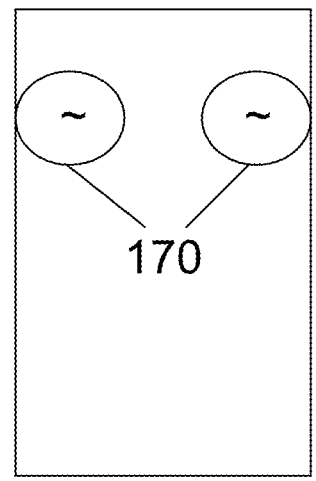

In FIG. 3A, the gas stream is directed only at the left edge of the soot layer. Although not illustrated, it will be appreciated that a gas stream could alternatively be directed at the center of the soot layer or at the right edge.

In FIG. 3B, the gas stream is directed both at the left edge and the center region of the soot layer. According to non-illustrated embodiments, a gas stream could be directed simultaneously at the center region and right edge, at the left and right edges, or across an entire width of the soot layer.

In FIG. 3C, the gas stream is directed across the entire width of the soot layer. However, in the illustrated embodiment, as gas flow rate at the edges is greater than a gas flow rate at the center region. A dotted line for the gas stream impact zone 170 is used to indicate the lower flow rate at the center region.

Finally, in FIG. 3D, a pulsed gas stream is directed at the edges of the soot layer. A tilde (~) within the gas stream impact zone 170 is used to indicate a variable flow rate at the edges in FIG. 3D. As suggested by the gas stream distributions shown in FIGS. 3A-3D, it will be appreciated that various permutations and combinations of gas flow rates may be selected in order to promote separation of the soot layer from the deposition surface.

Additional aspects of a suitable soot layer-separating device, including particular dimensions of the device, its orientation or positioning with respect to the soot layer to be separated, and the composition and nature of the gas stream can be readily selected by a skilled artisan. Particular features, though not intended to be limiting, are disclosed herein.

The gas stream may be temporally or spatially continuous or discontinuous. For instance, a gas stream having a constant flow rate may impinge a portion of the free surface of the soot layer, such as an edge portion of the soot layer. In an embodiment, the soot layer-separating device is configured to deliver a gas stream to an area of the deposited soot layer downstream of the deposition zone. As a further example, the gas stream can have a variable gas flow rate, e.g., a pulsed stream. The flow rate of the gas stream can be controlled using a suitable controller such as a needle valve, rotometer or mass flow meter. In exemplary embodiments, the gas stream flow rate can range from 0.1 to 10 msec.

The gas that impinges the surface of the soot can be a single gas composition or a gas mixture and can include elemental gases and/or compounds such as helium, nitrogen, oxygen, argon, forming gas, carbon monoxide and carbon dioxide. In addition, solid or liquid particles can be entrained in the gas stream such that the gas stream comprises a gaseous suspension of solid and/or liquid particles (e.g., an aerosol). It is believed that impingement of the gas stream on the free surface of the soot reduces a temperature of the soot, which can promote separation of the soot layer from the deposition surface. A temperature of the gas stream can be controlled. The gas stream can be heated or cooled prior to impinging on the surface of the soot. Example temperatures of the gas stream range from 0° C. to 200° C. (e.g., 0, 10, 20, 50, 100, 150 or 200° C.).

Figure 4:
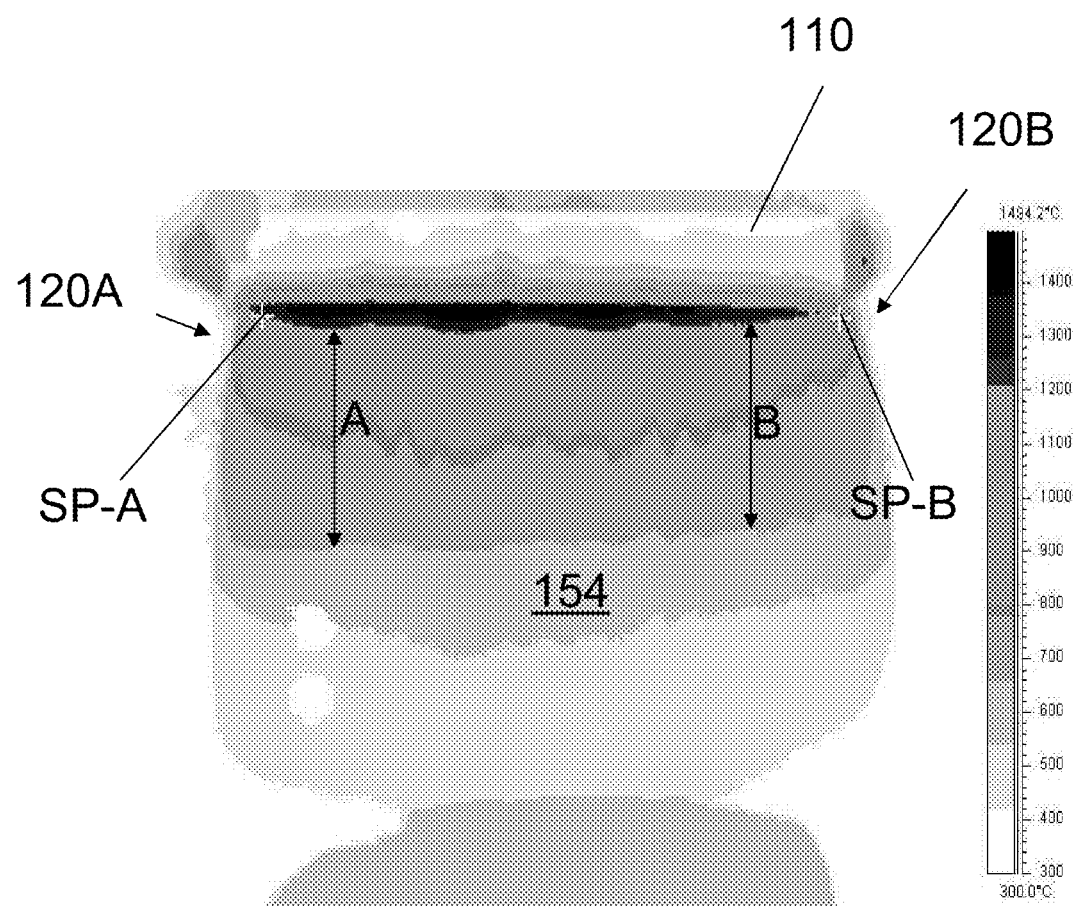
FIG. 4 is thermal imaging data for a glass soot sheet without use of a soot layer-separating device.
Figure 5:
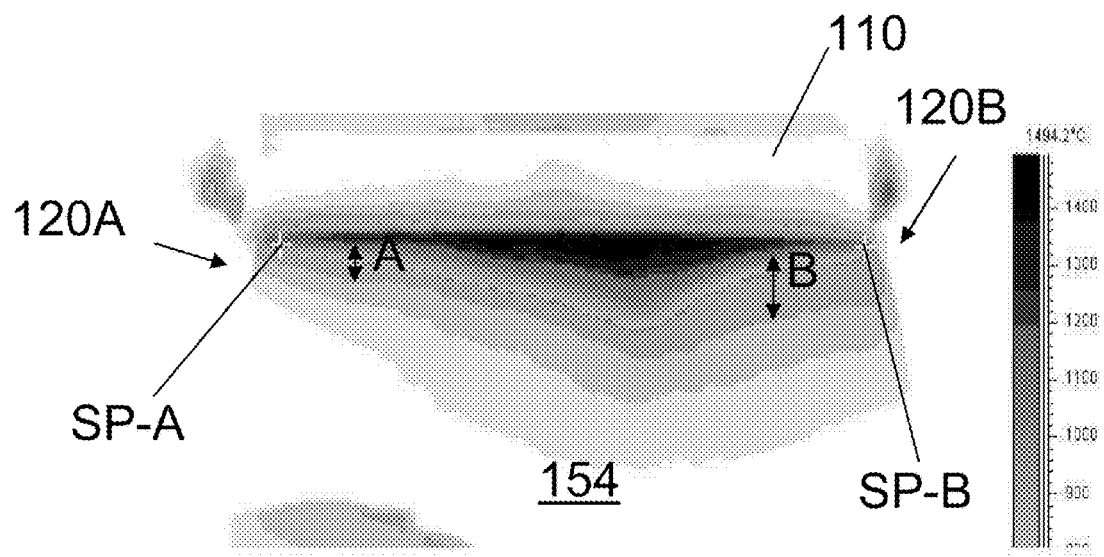
FIG. 5 is thermal imaging data for a glass soot sheet when a soot layer-separating device is used.

In a series of experiments, a FLIR S65 thermal imaging camera was used to measure a temperature profile of the glass soot both at and downstream of the deposition zone. A software package, ThermaCAM Researcher Professional 2.8 SR-1, was used to analyze the thermal imaging data. Thermal imaging data shown in FIGS. 4 and 5 depicts various isothermal regions associated with the apparatus and the deposited soot during formation of the soot layer and separation of the soot layer from the deposition surface. FIG. 4 shows thermal imaging data where a soot layer-separating device was not used, while FIG. 5 shows thermal imaging data according to an embodiment where a soot layer-separating device was used to direct a gas stream over a portion of the free surface of the deposited soot layer.

In FIGS. 4 and 5, a rectangular-shaped soot providing device 110 (e.g., a 9-column burner) is located near the top of each image. The back face of the soot providing device 110 is at a temperature of about 300° C. and, together with the background, appears lightest.

In the plan views of FIGS. 4 and 5, the soot receiving device 120 and the corresponding deposition surface 122 are located behind and below the soot providing device 110. The deposition zone is located below the soot providing device 110 and is associated with the highest temperatures. Left and right edges 120A, 120B of the soot receiving device 120 extend beyond the soot providing device 110, while the attached soot layer 152 and released soot sheet 154 are shown extending below the soot providing device 110 into the lower portion of each image.

Under the deposition conditions corresponding to FIG. 4 (no gas stream), the soot layer would stick to the deposition surface resulting in catastrophic tearing of the soot sheet. The sticking was observed particularly near the left edge 120A of the deposition zone. With reference to FIG. 4, it is clear from the thermal imaging that there is larger area of soot having a temperature in the 400° C.-1200° C. range on the left side of the sheet than on the right side. By employing a soot layer-separating device in the higher temperature region, the sticking was eliminated and a pristine soot sheet was produced.

The contribution of the gas stream to the temperature profile of the soot sheet is evident by comparing the thermal imaging data of FIG. 4 and FIG. 5. With reference to the left and right edges of each sheet, a dimension across a region having a temperature within the 800° C. to 1200° C. temperature band is indicated by arrows A and B. Impingement of the gas stream decreases a temperature of the soot in the region where the gas stream is applied, which facilitates separation of the soot layer from the deposition surface.

In addition to the thermal imaging data, which shows the temperature profile across the soot layer 152 and the soot sheet 154, localized temperature measurements were made near left and right edges 120A, 120B at points SP-A and SP-B, which are located slightly below the deposition zone and demarcated in FIGS. 4 and 5 by a cross (+). Temperature data from points SP-A and SP-B are summarized in Table 2 for successive deposition runs. Three sets of temperature data are shown for deposition conditions corresponding to no soot layer-separating device (FIG. 4) and a soot layer-separating device focused at the left edge 120A of the soot receiving device 120 (FIG. 5).

TABLE 2

Soot layer temperature at left and right edges during deposition

| | No gas stream | | | Focused gas stream | |
|---|---|---|---|---|---|
| | SP-A | SP-B | | SP-A | SP-B |
| Run 1 | 1213° C. | 1058° C. | Run 4 | 1205° C. | 1059° C. |
| Run 2 | 1235° C. | 1067° C. | Run 5 | 997° C. | 924° C. |
| Run 3 | 1189° C. | 1061° C. | Run 6 | 1023° C. | 1043° C. |
| Ave. (1-3) | 1212° C. | 1062° C. | Ave. (4-6) | 1075° C. | 1009° C. |
| | $\Delta T_{SPA-SPB}$ = 150° C. | | | $\Delta T_{SPA-SPB}$ = 66° C. | |

As seen with reference to Table 2, by using the soot layer-separating device to direct a focused gas stream near the left edge, an average temperature at the left edge of the soot sheet was decreased by 137° C., while an average temperature at the left edge of the soot sheet was decreased by 53° C. Stated another way, the temperature gradient between the left and right edges of the deposition surface was decreased. Prior to using the soot layer-separating device, the average temperature difference between the left and right edges was 150° C., compared to only 66° C. when a gas stream was focused near point SP-A.

In an example of a soot sheet comprising at least 90 mole % silica, an average soot density of the soot sheet can range from about 0.2 to 1.5 g/cm$^3$, e.g., from about 0.4 to 0.7 g/cm$^3$, or from about 0.8 to 1.25 g/cm$^3$, and an average thickness of the soot sheet can range from 10 to 600 μm, e.g., 20 to 200 μm, 50 to 100 μm or 300 to 500 μm.

In certain embodiments, particularly those involving continuous soot sheet and/or sintered glass sheet production, continuous movement of the soot sheet 154 away from the deposition surface after its release can be aided by a soot sheet guiding device 130. The soot sheet guiding device 130 can directly contact at least a portion of the soot sheet 154 in order to aid movement and provide mechanical support for the soot sheet.

To maintain a high surface quality of the soot sheet, the soot sheet guiding device 130 may contact only portions (e.g., edge portions) of the soot sheet 154. Specifically, the soot sheet guiding device can contact opposing edge portions of the soot sheet and apply a tensile stress across the soot sheet before the soot sheet enters the sintering zone of the soot sheet sintering apparatus.

The soot sheet guiding device can maintain a tensile stress across the soot sheet as the soot sheet passes through the sintering zone. For example, a sintering zone can have a length L' (i.e., in a direction of a length L of the soot sheet), and the soot sheet guiding device can apply tension across a width W of the soot sheet throughout the entire length L' of the sintering zone as well as both prior to and subsequent to the soot sheet entering and leaving the sintering zone.

Using a soot sheet guiding device, a continuous soot sheet can be fed into a sintering/annealing zone of a soot sheet sintering device 140 where at least a portion of the soot sheet is heated at a temperature and for a period of time sufficient to convert the heated portion into densified glass. For example, a soot sheet of high purity silica can be sintered at a temperature ranging from about 1000° C. to 1900° C., e.g., from about 1400° C. to 1600° C. to form a silica glass sheet 156. According to a further embodiment, the glass soot sheet is heated and sintered across at least 90% of its width (e.g., across its entire width). The sintering temperature and the sintering time can be controlled in order to form a sintered glass sheet that is essentially free of voids and gas bubbles. A glass sheet guiding device can be used to guide the glass sheet as it emerged from the sintering zone.

As used herein, sintering refers to a process whereby glass soot particles are heated below their melting point (solid state sintering) until they adhere to each other. Annealing is a process of heating and cooling glass to relieve internal stresses after it was formed. Sintering and annealing can be carried out sequentially using the same or different apparatus.

The glass sheet formation process may be controlled in order to minimize strain (e.g., sagging) of both the soot sheet and the resulting glass sheet. One way to minimize strain is to orient the soot sheet substantially vertically during sintering. According to embodiments, an angle of orientation of the soot sheet with respect to a vertical orientation can be less than 15 degrees (e.g., less than 10 or 5 degrees).

A variety of different soot sheet-sintering devices such as resistive heating and induction heating devices can be used to sinter the soot sheet. The thermal history of both the soot sheet and the glass sheet can affect the final thickness, composition, compositional homogeneity and other chemical and physical properties of the glass sheet. A glass sheet can be formed by applying heat to one or both of the major surfaces of the soot sheet. During sintering, various parameters can be controlled including temperature and temperature profile, time and atmosphere.

Though a sintering temperature can be selected by skilled artisan based on, for example, the composition of the soot sheet to be sintered, a sintering temperature can range from about 1000° C. to 1900° C. Further, a homogeneous sintering temperature profile, which is achievable with both resistive and induction heating sources, can be used to create homogeneity within the final glass sheet. By "homogeneous sintering temperature profile" is meant a sintering temperature that varies by less than 20% (e.g., less than 10 or 5%) over a predetermined sample area or sample volume.

In embodiments where an edge portion of the soot sheet is held and guided by the soot sheet-guiding device, that edge portion is typically not sintered by the sintering device. For example, in one embodiment, the center 10 cm of a soot sheet having an average thickness of about 400 microns and a total width of 24 cm was heated to produce a sintered glass sheet having a width of about 10 cm and an average thickness of about 100 microns. Prior to sintering, an average density of the soot sheet is about 0.5 g/cm$^3$.

In addition to controlling the temperature and the temperature profile during sintering, the gas ambient surrounding the soot sheet/glass sheet can also be controlled. Specifically, both the total pressure as well as the partial pressure of suitable sintering gases can be selected in order to control the sintering process. In certain embodiments, a controlled gas mixture can comprise one or more active or inert gases such as, for example, He, $O_2$, CO, $N_2$, Ar or mixtures thereof.

During the act of sintering, the soot sheet may be held stationery, or moved continuously or semi-continuously within a sintering zone. For example, in a continuous glass sheet forming process, a rate of production of the soot sheet as it is released from the soot deposition surface may be substantially equal to a rate of translation of the soot sheet through the sintering zone. Sintering may be performed via one or more passes through a sintering zone using the same or different sintering conditions. A linear velocity of the soot sheet (or glass sheet) through the sintering zone can range from 0.1 mm/sec to 10 mm/sec (e.g., 0.1, 0.2, 0.5, 1, 2, 3, 4, 5 or 10 mm/sec). In scale-up, it is believed that the linear velocity of the deposition surface can be increased up to 1 m/sec or higher. A distance from the soot sheet sintering device to the soot sheet surface can range from about 1 mm to 10 mm (e.g., 1, 2, 3, 4, 5, 6, 7, 8, 9 or 10 mm).

Once formed, the glass sheet may be divided into discrete pieces by a suitable cutting device. For example, a laser can be used to cut the glass sheet into smaller pieces. Further, before or after cutting, the sintered glass can be subjected to one or more post-sintering processes, such as annealing, edge removal, coating, polishing, etc. A long ribbon of sintered glass sheet can be reeled by a reeling device into a roll. Optionally, spacing materials such as paper sheet, cloth, coating materials, etc. can be inserted in between adjacent glass surfaces in the roll to avoid direct contact there between.

The process and apparatus disclosed herein are suited for making soot sheets and sintered glass sheets comprising a high percentage of silica, e.g., "high-silica" glass sheets. By "high-silica" is meant a glass composition comprising at least 50 mole % silica glass, e.g., greater than 50, 55, 60, 65, 70, 75, 80, 85, 90, 95, 98, 99, 99.5 or 99.9 mole % silica.

Flexible sintered glass sheets, including long glass ribbons, can be formed. Sintered glass sheets such as high-silica glass sheets can have an average thickness of 150 microns or less (e.g., less than 150, 100, 50, or 25 microns). Example glass sheets have a thickness of 10, 30, 50 or 100 µm. By controlling width of the deposited soot sheet, the width of the sintering zone, and the amount of deposition time, it is possible to independently control both the width and the length of sintered glass sheets. A length of the glass sheet can range from about 2.5 cm to 10 km. A width of the glass sheet can range from about 2.5 cm to 2 m.

The process can be used to form high surface quality glass sheets (e.g., glass sheets having low surface waviness, low surface roughness, and which are essentially free from scratches). The above-disclosed process, which can include an initial step of forming a soot sheet on a roll, and a final step of reeling a sintered, flexible glass sheet onto a roll, can be referred to as a "roll-to-roll" process. The resulting glass sheets, including high-silica glass sheets, can be characterized by a number of properties including composition, thickness, surface roughness, surface uniformity and flatness.

As used herein, "soot layer" or "layer of soot" refers to a stratum of essentially homogeneously-distributed glass particles that are optionally bonded with each other. The layer generally has an average total thickness that is greater than or equal to an average diameter of individual particles. Further, a soot layer may comprise a single soot layer having an essentially homogeneous composition or multiple soot layers each having an essentially homogeneous composition. In embodiments, parameters describing the gas stream such as chemical composition of the gas, gas flow rate, gas temperature, and the location of the impingement can be selected and optimized based on parameters describing the soot sheet such as soot composition, soot thickness, and the local or average soot temperature.

In embodiments where the soot layer comprises multiple layers, one species of glass particles can form a first soot layer, while a second species of glass particles can form a second soot layer adjacent to the first soot layer. Thus, respective soot layers can have distinctive compositional and/or other properties. Moreover, in an interfacial region between the first and second layers, blending of the two species of particles can occur such that the composition and/or properties at the interface of contiguous layers may deviate from the bulk values associated with each respective layer.

Reference herein to a "glass sheet" includes both sheet materials comprising a plurality of glass soot particles (i.e., soot sheets) and sheet materials made of sintered glass. As is typically understood in the art, a sheet has two major opposing surfaces that are typically substantially parallel to each other, each having an area larger than that of other surfaces. A distance between the two major surfaces at a certain locations is the thickness of the sheet at that particular location. A sheet may have a substantially uniform thickness between the major surfaces, or the thickness can vary spatially either uniformly or non-uniformly. In certain other embodiments, the two major surfaces can be non-parallel, and one or both of the major surfaces can be planar or curved.

As used herein, "sintered glass" refers to a glass material having a density of at least 95% of a theoretical density (Dmax) for a glass material having the same chemical composition and microstructure under conditions of standard temperature and pressure (STP) (273 K and 101.325 kPa). In certain embodiments, it is desired that the sintered glass has a density of at least 98%, 99% or 99.9% of Dmax under STP.

Additional aspects of glass sheet formation using a glass soot deposition and sintering process are disclosed in commonly-owned U.S. application Ser. Nos. 11/800,585 and 12/466,939, filed May 7, 2007 and May 15, 2009, respectively, the contents of which are incorporated herein by reference in their entirety.

As used herein, the singular forms "a," "an" and "the" include plural referents unless the context clearly dictates otherwise. Thus, for example, reference to a "metal" includes examples having two or more such "metals" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" in a particular way. In this respect, such a component is "configured" to embody a particular property, or function in a particular manner, where such recitations are structural recitations as opposed to recitations of intended use. More specifically, the references herein to the manner in which a component is "configured" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of separating a glass soot layer from a substrate, the method comprising:
    forming a glass soot layer on a substrate, the glass soot layer having a first main surface in direct physical contact with the substrate, and a second main surface opposed to the first main surface; and
    contacting at least a portion of the second main surface with a gas stream so as to separate a corresponding portion of the first main surface from the substrate, wherein the gas stream comprises an aerosol.

2. The method according to claim 1, wherein the contacting comprises locally contacting one or more edge regions of the glass soot layer.

3. The method according to claim 1, wherein the contacting comprises locally contacting the glass soot layer in one or more areas downstream of a deposition zone.

4. The method according to claim 1, wherein the gas stream has a substantially constant gas flow rate.

5. The method according to claim 1, wherein the gas stream comprises a gas selected from the group consisting of helium, nitrogen, oxygen, argon, forming gas, carbon monoxide, carbon dioxide and mixtures thereof.

6. The method according to claim 1, wherein an impingement angle of the gas stream on the glass soot layer relative to normal incidence is less than 45°.

7. The method according to claim 1, wherein an impingement angle of the gas stream on the glass soot layer relative to normal incidence is less than 10°.

8. The method according to claim 1, where the contacting occurs during rotation of the substrate.

\* \* \* \* \*